United States Patent [19]

Brown et al.

[11] 4,326,137
[45] Apr. 20, 1982

[54] LOW-DRAG ELECTRICAL CONTACT ARRANGEMENT FOR MAINTAINING CONTINUITY BETWEEN HORIZONTALLY MOVABLE MEMBERS

[75] Inventors: R. Jack Brown, Clinton; Howard L. Gerth, Knoxville; Samuel C. Robinson, Clinton, all of Tenn.

[73] Assignee: The United States of America as represented by the United States Department of Energy, Washington, D.C.

[21] Appl. No.: 228,035

[22] Filed: Jan. 23, 1981

[51] Int. Cl.³ .............................................. H02K 41/00
[52] U.S. Cl. ..................................... 310/12; 310/219; 310/178
[58] Field of Search ................................. 310/12–14, 310/178, 219

[56] References Cited

U.S. PATENT DOCUMENTS

| | | | |
|---|---|---|---|
| 2,828,431 | 3/1958 | Klaudy | 310/219 X |
| 2,845,554 | 7/1958 | Schwab et al. | 310/178 |
| 2,901,580 | 8/1959 | Kelly | 310/219 UX |
| 3,534,203 | 10/1970 | Sommeria | 310/19 |
| 3,604,967 | 9/1971 | Krulls et al. | 310/178 |
| 3,852,626 | 12/1974 | Davis | 310/13 |
| 3,870,914 | 3/1975 | Walker | 310/219 |
| 3,916,235 | 10/1975 | Massar | 310/219 |
| 3,984,715 | 10/1976 | Kullmann et al. | 310/219 |
| 4,171,496 | 10/1979 | Eriksson | 310/219 |
| 4,247,793 | 1/1981 | Rough | 310/12 |

*Primary Examiner*—Donovan F. Duggan
*Attorney, Agent, or Firm*—Fred O. Lewis; Stephen D. Hamel; Richard G. Besha

[57] ABSTRACT

This invention is a low-drag electrical contact arrangement for establishing continuity between upper and lower spaced members which are subject to relative horizontal movement. In one aspect, the invention comprises an electrical commutating arrangement which includes a horizontally disposed linear electrical commutator. A horizontally movable electrically conductive pedestal is positioned below the commutator and defines a clearance therewith. The pedestal is formed with a cavity confronting the commutator. In the cavity is a bead of electrical conductive liquid, the bead being characterized by an upwardly convex meniscus portion which extends across the clearance and contacts the commutator. The surface tension of the bead is sufficient to maintain the bead intact when the commutator and pedestal are displaced horizontally at speeds from zero to at least twelve inches a minute. This arrangement provides a significant advance in highly precise machining processes, such as diamond-turning, where precision is limited by the drag imposed by conventional commutators of the carbon-brush type.

10 Claims, 3 Drawing Figures

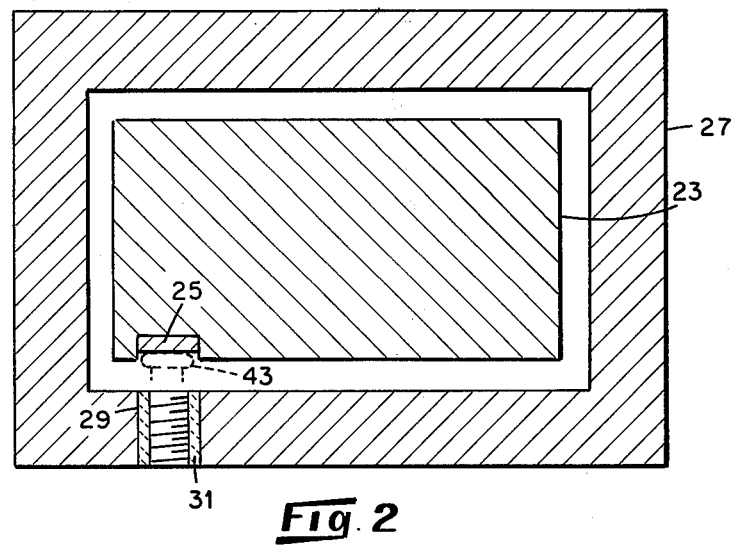
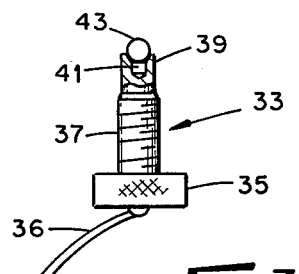

LOW-DRAG ELECTRICAL CONTACT ARRANGEMENT FOR MAINTAINING CONTINUITY BETWEEN HORIZONTALLY MOVABLE MEMBERS

BACKGROUND OF THE INVENTION

1. Field of the Invention

This invention relates generally to electrical contacts for maintaining electrical continuity between members subject to relative horizontal motion. More particularly, it relates to a contact arrangement for maintaining electrical continuity between upper and lower spaced surfaces, one of which is movable horizontally with respect to the other, while imposing minimal drag. This invention was made as a result of a contract with the United States Department of Energy.

2. Problem

This invention was made in response to a problem which arose during testing of an experimental system for automatically positioning a diamond-tipped cutting tool to a precision of ± 0.6 microinch. The cutting tool was mounted on a carriage which in turn was supported and guided along an axis by fluid bearings. The carriage was to be driven by a commercially available d.c. linear electric motor including a permanent magnet which was affixed to the carriage and which extended freely about an elongated horizontally extending stationary armature containing a series of axially spaced, separate windings. Mounted on the bottom of the armature was a horizontally extending linear commutator whose segments were connected to the windings. The permanent magnet carried a plurality of standard spring-loaded carbon brushes for contacting the commutator segments and selectively energizing the armature windings so that, for any position of the carriage, only the winding nearest the magnet was energized. The linear motor was connected in a conventional continuous-path closed-loop position-control system generally similar to that disclosed in U.S. Pat. No. 4,221,995, issued on Sept. 9, 1980, to W. E. Barkman. Unfortunately, tests of the experimental positioning system showed that because of excessive friction resulting in stick-slip problems, the carriage could be positioned with a precision of only about 35 microinches.

3. Previous Related Work

The above-referenced patent to Barkman discloses a positioning system in which the carriage is driven by a linear electric motor which does not utilize brushes or a commutator. The motor is relatively bulky and generates appreciable heat. U.S. Pat. No. 4,171,496, to Eriksson, describes an electrical contacting arrangement including two conductors which are disposed for relative rotation and are each formed with an annular ring. The rings extend respectively into electrically interconnected grooves provided in an auxiliary rotor. The rotor is driven to force liquid metal into the grooves, thus connecting the rings on the two conductors. U.S. Pat. No. 3,870,914, to Walker, describes an electrical contact arrangement for a vertically disposed rotatable electric machine in which mercury is vaporized from a heated reservoir in the base of the machine and condenses in a vertically extending capillary formed by a fixed contact ring and a contact affixed to the rotor of the machine. The machine volume exposed to mercury vapor is sealed from atmosphere. U.S. Pat. No. 3,916,235, to Massar, describes a contact arrangement in which two relatively rotatable conductors form an annular gap. Liquid metal from an external supply is pumped through bores to completely fill the gap and thus connect the conductors. Preferably, a metallic ring is provided in the annular gap to float on the liquid metal. U.S. Pat. No. 2,845,554, to Schwab et al, describes a contact arrangement for interconnecting a rotatable member and two spaced, fixed members. The rotatable member is formed with a ring of triangular section, which rotates in the annular space between the fixed members. An electrically conductive liquid is circulated through the annular clearances between the fixed and rotating members, through a cooler, and back to the clearances. None of these arrangements is well suited for use with upper and lower elongated members which are subject to relative horizontal movement.

SUMMARY OF THE INVENTION

In one aspect, the invention is an electrical contact arrangement that includes electrically conductive upper and lower members which are separated by a clearance and are mounted for relative horizontal movement. The lower member has a horizontal top surface which defines a cavity confronting a bottom surface of the upper member. Disposed in the cavity is a body of an electrically conductive liquid having a convex meniscus portion which extends across the clearance contacts against the aforementioned bottom surface. The surface tension of the liquid is sufficient to maintain the liquid body intact when the members are subjected to relative horizontal movement at speeds up to at least twelve inches a minute. In another aspect of the invention, the upper member is a horizontally disposed linear electrical commutator and the lowest member is an electrically conductive pedestal for supporting the liquid body. In another aspect, the invention comprises a low-friction tool-carriage arrangement. The arrangement includes a bed which carries fluid-film bearings for supporting a carriage which is reciprocatable along a horizontal axis. The carriage is reciprocated by a linear electric motor which includes an elongated stator having axially spaced windings which are connected to a horizontally disposed linear commutator carried by the stator. The motor also includes a permanent magnet which extends freely about the stator and is affixed to the carriage; the motor moves the carriage along the aforementioned axis when a selected stator winding is energized. The carriage assembly carries brushes for respectively contacting the commutator segments. Each brush assembly includes an electrically conductive pedestal which supports a bead of electrically conductive fluid having an upwardly convex meniscus portion which extends upwardly above the pedestal a sufficient distance to make electrical contact with the commutator.

OBJECTS

It is an object of this invention to provide a novel electrical contact arrangement.

It is another object to provide an electrical contact arrangement for maintaining low-friction contact between a fixed member and member spaced therefrom which define an operating clearance, one of the surfaces being horizontally movable.

It is another object to provide a novel electrical commutating arrangement utilizing a linear commutator.

It is another object to provide a novel low-friction carriage arrangement for positioning a tool—such as a diamond knife, a probe, or a gauging member.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIG. 2 is a sectional view taken along line 2—2 of FIG. 1 and showing in phantom the tip of a special brush assembly for contacting a commutator 25, and FIG. 3 is a longitudinal sectional view of a brush assembly designed in accordance with the invention. The drawings are not to scale.

DETAILED DESCRIPTION OF THE INVENTION

Figure 1:
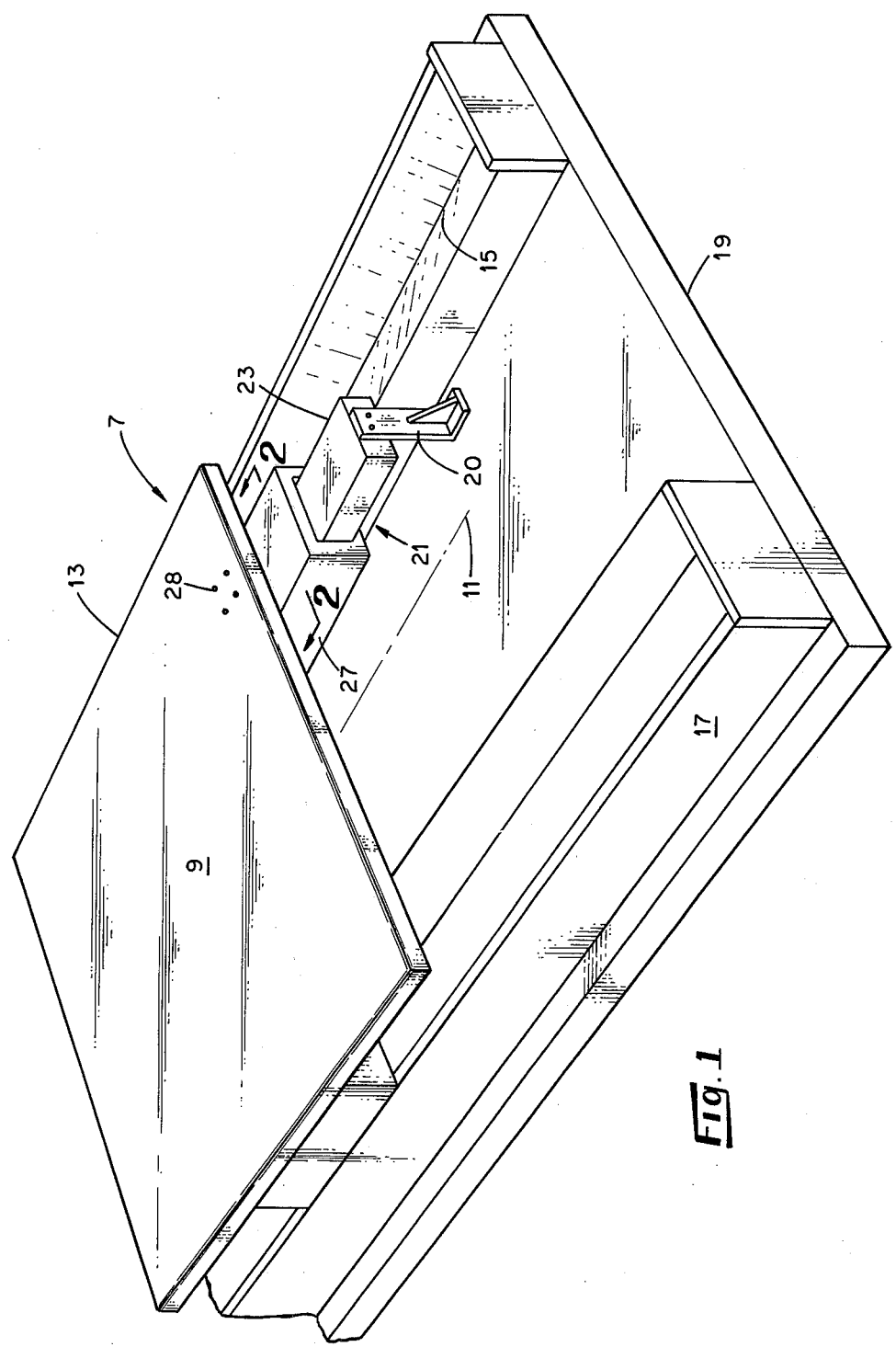
FIG. 1 is a perspective view of a low-friction tool-carriage arrangement designed in accordance with this invention.

Referring to the experimental positioning system described above under "Background", we have found that the aforementioned stick-slip problem is due in large part to friction, or drag, between the linear commutator and the spring-loaded carbon brushes bearing thereon. To overcome this deficiency, we have developed a special brush which reduces that friction to close to the absolute minimum. The brush also reduces the transmission of vibrations across the brush-to-commutator interface. As a result, the desired positioning precision ($\pm$ 0.6 microinch) can be obtained at carriage speeds up to many inches a minute.

The invention is illustrated as incorporated in a low-friction carriage arrangement designated as 7. The carriage arrangement is designed for use in microinch machining operations (e.g., diamond turning) and for carriage speeds on the order of from zero to, say, twelve inches a minute. For simplicity, the arrangement will be described in terms of movement along only one axis.

Referring to FIGS. 1 and 2, the illustrative arrangement includes a horizontally disposed tool-carriage 9, or slide, which is mounted for reciprocation along an axis 11. The carriage is supported by fluid-film bearings 13 (only one of which is in view); the bearings mate respectively with a V-type bearing way 15 and a flat bearing way 17. As shown, the ways are supported by a stationary bed 19. The above-mentioned components are of conventional design. The carriage 9 is positioned incrementally along the axis 11 by means of a linear electric motor 21, which is incorporated in any suitable automatic position-control loop (not shown). The linear motor is of the linear-commutator type and is of conventional design, with the exception that its standard spring-loaded carbon brushes are replaced with low-friction brushes of a special design (to be described).

The motor 21 includes an elongated stator 23, which extends parallel to the axis 11. As shown, an end of the stator is rigidly supported by a bracket 20 affixed to the bed 19. The stator includes a series of axially spaced, internal windings (not shown), whose ends are connected to a linear commutator recessed in the bottom of the stator and extending parallel to the axis 11. A typical bar 25 of the commutator is shown in FIG. 2.

The motor also includes an open-centered permanent magnet 27, which is affixed by machine screws 28 to the underside of the carriage 9. The magnet extends about a section of the stator, defining a continuous narrow clearance therewith.

Referring to FIG. 2, the base of the magnet 27 is formed with a series of vertical bores 29, positioned for sequential registry with the commutator bars. Cylindrical insulators 31 are respectively mounted in the bores, each insulator being threaded internally to receive a brush assembly. The brush-and-commutator arrangement is such that when a d.c. positioning pulse of a given polarity is received, it is impressed across whichever stator winding is nearest the center of the magnet 27. The magnetic field generated by that winding reacts with the field of the permanent magnet to effect incremental movement of the magnet-and-carriage assembly in a selected direction along the axis 11. A pulse of the opposite polarity moves the assembly in the opposite direction.

In accordance with the invention, the low-friction carriage arrangement 7 utilizes special brush assemblies whose contact with the commutator is characterized by high conductivity and minimal drag. FIG. 3 illustrates a typical special brush assembly 33, which includes an electrically conductive T-shaped pedestal 35. A wire 36 is connected to the lower end of the pedestal to connect the same to any suitable electrical circuit for generating drive pulses for the motor. The pedestal, which includes a threaded shank 37 and an upper tip 39, is threaded into an insulator 31, the tip 39 defining a selected narrow operating clearance with the commutator. The tip is formed with a depression 41, or cavity, which confronts the commutator 25. As shown, the depression contains a small body or bead 43 of mercury having an upwardly convex meniscus portion which extends above the tip and across the aforementioned operating clearance to contact the commutator 25. (See FIG. 2) Preferably, the pedestal is threaded into the insulator 31 to a point where the meniscus portion of the mercury bead is flattened somewhat by contact with the commutator. If desired, a continuity tester may be connected across the pedestal and commutator to indicate when contact is established.

We have found that the mercury bead 43 resists displacement from the cavity 41 and breakaway of the meniscus portion at carriage speeds which are suitable for microinch machining operations. That is, at such speeds, gravity maintains the bead in the cavity, and the surface tension of the mercury is sufficient to maintain the integrity of the bead. This was not predictable. As compared with the spring-loaded brushes normally used with the motor 21, the new arrangement provides an electrical contact which is characterized not only by less drag but also by high conductivity, less arcing, and less transmission of vibration. Referring again to the tip 39, we prefer to promote retention of the bead in the tip by forming the upper portion of the cavity sidewall with an upward flare. If desired, retention also can be promoted by fabricating the basal portion of the cavity of a material which is wetted by mercury.

The following is a more detailed description of the above-described form of the invention.

EXAMPLE

A low-friction carriage arrangement of the kind shown in the drawings was fabricated and tested. The linear electric motor 21 was a commercial design (Model FM 1903, manufactured by Inland Motor Division, Kollmoger Corp., of Radford, Virginia). The motor commutator bars were composed of copper alloy. The motor was energized by a closed-loop position-control system similar to that described in above-referenced U.S. Pat. No. 4,221,995, with the exception that the position-command pulses were not fed into a microprocessor but into a conventional General Electric Mark Century 7500 Machine Controller. The carriage 9 was supported by standard pressurized oil-film bearings. The insulators 31 were composed of Bakelite and the brush pedestals 35, of aluminum. The pedestal cavity 41, which was formed by drilling and countersinking, had a depth of 0.100" and a maximum diameter of 0.125". The mercury bead 43 was of spheroidal shape and had a diameter of 0.125". When out of contact with the commutator, the meniscus portion of the bead extended at a maximum of about ⅛" above the tip 39. The operating clearance between the pedestal and the commutator was approximately 35 mils. With a load of 2100 pounds on the carriage, the control system positioned the carriage to the target precision of ± 0.6 microinch, at carriage speeds in the desired range (about 0 to 0.200" per minute). These values are suitable for high-precision gauging, diamond-turning, and the like. No stick-slip problems were observed. In contrast, when spring-loaded carbon brushes were used in the same system, the stick-slip condition caused by the brushes made the system unusuable for precision gauging, diamond-turning and the like. The improved system was tested intermittently over a period of three months with no evidence of loss or deterioration of the mercury or of corrosion or wear of the commutator bars. The current density in the typical mercury bead was estimated to be about 100 amps/in$_2$. As compared with carbon brushes, much less arcing occured at the brush-to-commutator interface.

The foregoing description of a preferred embodiment of the invention has been presented for purposed of illustration and description. It is not intended to be exhaustive or to limit the invention to the precise form disclosed, and obviously many modifications and variations are possible in light of the above teaching. For example, the pedestal 35 need not be composed throughout of electrically conductive material, so long as it includes a suitable conductor for maintaining the bead 43 in circuit with the electrical input for the motor. The phrase "electrically conductive" as used herein with respect to the pedestal is intended to include both designs. The pedestal cavity 43 may be of various shapes and depths: for example, its open end may define a rectangle. We prefer that the body of mercury be sized to provide a convex meniscus portion which extends at least 1/16" above the pedestal. We have found that beads of mercury having a diameter of from about 0.06" to 0.125" are especially suitable; thus, the amount of mercury inventory and the amount of mercury exposed to atmosphere is very small. At bead diameters exceeding about 0.250", the meniscus portion tends to flatten appreciably. The bead 43 may be any current-conducting fluid (e.g., mercury or amalgam) which is characterized by a meniscus portion of the kind described and which is liquid at the desired operating temperature. Preferably, the commutator bars are composed of a material which is not wet by the liquid. Preferably, the operating clearance between the pedestal and commutator is in the range of from 10 to 50 mils.

Our tests of the type of brush illustrated in FIG. 3 have been conducted at carriage speeds consistent with certain diamond-turning operations. Based on these tests, it is our opinion that the brush should perform satisfactorily at carriage speeds up to at least fifty inches per minute.

It is intended that the scope of the invention be defined by the claims appended hereto.

What is claimed is:

1. An electrical contact arrangement, comprising:
   upper and lower electrically conductive members which are separated by a clearance and which are mounted for relative horizontal movement, the lower member having a horizontal top surface portion which defines a cavity confronting a bottom surface of the upper member, and
   a body of an electrically conductive liquid in said cavity, said body having an upwardly convex meniscus portion which spans said clearance and contacts said bottom surface, the surface tension of said liquid being sufficient to maintain said meniscus portion intact when said members are subjected to relative horizontal movement at speeds up to at least twelve inches a minute.

2. The apparatus of claim 1 wherein said liquid is mercury.

3. The apparatus of claim 1 wherein said body is generally spheroidal.

4. The apparatus of claim 1 wherein the sidewall of said cavity is flared upwardly.

5. An electrical commutating arrangement, comprising:
   a horizonally disposed linear electrical commutator,
   an electrically conductive pedestal positioned therebelow and defining a clearance therewith, said commutator and pedestal being mounted for relative horizontal movement, said pedestal being formed with a cavity confronting said commutator, and
   a bead of electrically conductive liquid in said cavity, said bead having an upwardly convex meniscus portion which extends across said clearance and contacts said commutator, the surface tension of said liquid being sufficient to maintain said bead intact when said commutator and pedestal are displaced horizontally at speeds up to at least twelve inches a minute.

6. The apparatus of claim 1 wherein said liquid is mercury.

7. The apparatus of claim 1 wherein said clearance is in the range of from 10 to 50 mils.

8. A low-friction tool-carriage arrangement, comprising:
   a stationary bed,
   fluid-film bearings mounted thereon,
   a carriage supported by said bearings for reciprocation along a horizontal axis,
   a linear electric motor for reciprocating said carriage, said motor including an elongated stator having axially spaced windings connected to a segmented, horizontally disposed linear commutator carried by said stator, for selectively energizing said windings, said motor also including a permanent-magnet which is spaced from said stator and is affixed to said carriage for moving the same along said axis when a selected one of said windings is energized, and
   brush assemblies carried by the carriage-and-magnet assembly for respectively contacting segments of said commutator, each brush assembly including an electrically conductive pedestal which supports a bead of electrically conductive liquid, said bead having an upwardly convex meniscus portion which extends upwardly above said pedestal a sufficient distance to make electrical contact with said commutator.

9. The apparatus of claim 8 wherein said liquid has sufficient surface tension to maintain said bead intact when the carriage-and-magnet assembly is moved along said axis at speeds up to at least twelve inches per minute.

10. The apparatus of claim 9 wherein said liquid comprises mercury and said bead had a diameter in the range of from 0.06" to 0.250".

* * * * *